United States Patent Office 3,392,149
Patented July 9, 1968

3,392,149
PROCESS FOR THE PRODUCTION OF NITROGENOUS COPOLYMERS OF FORMALDEHYDE AND THE RESULTANT PRODUCTS
Wolfgang von der Emden and Ernst-Ulrich Köcher, Leverkusen, Germany, assignors to Farbenfabriken Bayer Aktiengesellschaft, Leverkusen, Germany, a corporation of Germany
No Drawing. Filed Mar. 22, 1966, Ser. No. 536,270
Claims priority, application Germany, June 12, 1965,
F 46,312
12 Claims. (Cl. 260—67.5)

ABSTRACT OF THE DISCLOSURE

Copolymers formed by reacting trioxane and sulphonylacetidines of the formula:

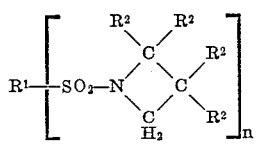

wherein $R^2$ alone is hydrogen or alkyl, $R^2$ together with another $R^2$ is a saturated heterocyclic ring containing oxygen or nitrogen as the heteroatom, $n$ is 1 or 2, $R^1$ is a monovalent aliphatic or aromatic radical when $n$ is 1 and $R^1$ is a divalent aliphatic or aromatic radical when $n$ is 2.

---

Objects of the invention are novel thermostable copolymers of formaldehyde and a process for the production of these copolymers, in which trioxane is polymerised in the presence of cyclic, organo-nitrogen compounds.

It is known to transform formaldehyde by various methods into linear polymers of differing chain lengths. These polymers, so-called polyoxymethylenes, are easily and quantitatively split by thermal treatment into monomeric formaldehyde, reversing the reaction of their formation.

Trioxane, the cyclic trimer of formaldehyde, can also be polymerised in the presence of cationically active catalysts, in particular Lewis acids, to form linear polyoxymethylenes, but these polymers are also thermally unstable as they are essentially the same products as formed from formaldehyde. As shown by H. Staudinger in 1930, polyoxymethylenes having improved thermostability are obtained, if their terminal groups are modified. This modification consists essentially in introducing terminal acetyl or methoxy groups. The introduction of terminal alkyl groups contributes products which, because of their pure polyacetal structure, have an excellent resistance to alkalis and an improved thermostability.

These modfied polyoxymethylenes still have a thermostability which is insufficient since acids and oxygen still cause a splitting of the polyoxymethylene chains. The resulting split chains terminate in a formaldehyde group and are subject to total degradation in the same way unmodified polyoxymethylenes are. Two methods have already been indicated for counteracting this degradation. In one method, the influences of oxygen and of acids is counteracted by introducing additional stabilisers which has the effect of preventing degradation. In the other method, copolymers are produced from trioxane and cyclic ethers, acetals and lactones, which not only contain (—$CH_2O$—) structural elements, but also to a small extent (—$CH_2$—$CH_2$.O—) elements. Once degradation of the chain has commenced, this should stop at such an oxyethylene group. The effect of this method is however not very significant so that these copolymers have to be stabilised additionally, by admixing stabilisers.

A further advance in improving the thermostability of polyoxymethylenes is achieved by copolymerising trioxane and cyclic sulfur containing monomers. But these comonomers slow down the polymerisation speed of the monomer mixture. These monomers, therefore, can be used in small quantities only.

A process for the production of copolymers of formaldehyde with an improved thermostability has now been found, in which trioxane is polymerised together with sulphonylacetidines in the presence of cationically active catalysts. Sulphonyl acetidines of the general formula:

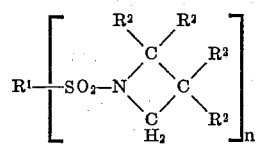

wherein $R^1$ represents a monovalent or divalent aliphatic or aromatic radical, and $R^2$ represents hydrogen or alkyl or two radicals $R^2$ together represent a saturated heterocyclic ring, containing oxygen or nitrogen on the heteroatom, and $n$ represents 1 or 2, are particularly suitable.

$R^1$ is advantageously an alkyl or alkylene radical with 1 to 6 carbon atoms or a phenyl, phenylene, tolyl or tolylene radical. $R^2$ is advantageously hydrogen or an alkyl radical with from 1 to 6 carbon atoms. Two radicals $R^2$ on the same carbon atom may advantageously form a 4-membered heterocyclic ring together with the carbon atom they are bound to, the heteroatom being oxygen or nitrogen, so that a Spiro compound is formed. If this heterocyclic radical contains nitrogen, this nitrogen atom may be substituted by a $SO_2$—$R^1$ radical.

The following are examples of compounds which come within this general formula and are preferred co-monomers:

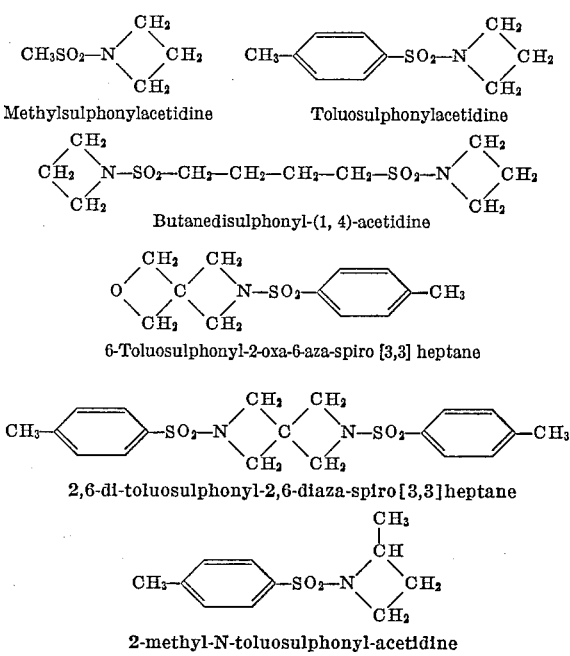

Sulphonyl acetidines are known compounds; they are obtained either from the corresponding sulphonamides and 1,3-dibromopropane (Ber., 31, 3264 (1898)), or by ring closure of compounds of the formula:

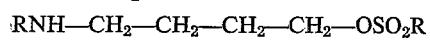

or

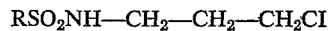

(J. Org. Chem. 26, 138 (1961)). The spiro cyclic compounds are obtainable from pentaerythritol by way of tribromomonoacetylpentaerythritol (Bull. Soc. Chim. Bel., 58, 157 (1949), and J. Chem. Soc., 1938, 1588).

One the one hand, these comonomers act as stabilisers and on the other hand they introduce structural units into the polyoxymethylene chain at which the chain decomposition comes to a stop. These positions are designated as "nodes." The new comonomers thus combine the action of admixed stabilisers with the action of the co-monomers formerly employed. A particular advantage of this invention is that the stabilising co-monomers are chemically bound in the polymer and cannot be removed therefrom even by heating. The stabilising effect of the new copolymers results in an improved oxidation resistance of the polymers obtained and in a considerably reduced acid sensitivity.

In the present process, the quantity of these co-monomers to be added is advantageously in the range of from 0.5 mole percent to 5 mole percent, based on the trioxane, if the polymer obtained is to be a thermoplastic resin. Larger quantities of the co-monomer up to 50 mole percent can be introduced if modified polymers are desired, such as, for example, copolymers having a lower melting point, a lower degree of crystallisation or improved solubility in organic solvents.

In a preferred embodiment of this invention two different comonomers of Formula I are used simultaneously. More specifically trioxane is copolymerised with a monofunctional co-monomer of Formula I, i.e. a monomer containing one —$SO_2$—N< radical in an amount of 0.5 to 5 mole percent based on the trioxane and simultaneously with a bifunctional co-monomer of Formula I, i.e. a co-monomer containing two radicals —$SO_2$—N<, in an amount of 0.05 to 0.5 mole percent. Monofunctional copolymers are compounds of the general formula

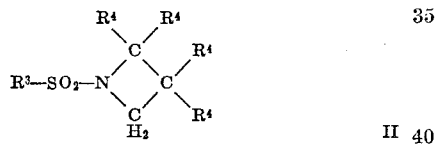

II wherein $R^3$ represents an alkyl radical having preferably 1–6 carbon atoms and an aryl radical, preferably phenyl and tolyl and $R^4$ represents hydrogen and an alkyl radical, having preferably 1–6 carbon atoms and wherein two radicals $R^4$ together form an oxygen containing heterocyclic ring having preferably 4 ring members.

Bifunctional co-monomers are compounds of the general formula

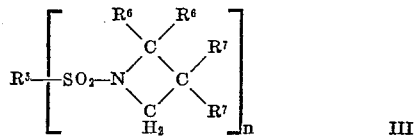

III wherein in case $n$ is 2, $R^5$ is an alkylene radical having preferably 1–6 carbon atoms and an arylene radical preferably phenylene and tolylene and $R^6$ and $R^7$ is hydrogen and alkyl radical having preferably 1–6 carbon atoms and wherein in case $n$ is 1, $R^5$ represents an alkyl radical having preferably 1–6 carbon atoms and an aryl radical preferably phenyl and tolyl, $R^6$ is hydrogen and an alkyl radical having preferably 1–6 carbon atoms and the two radicals $R^7$ together with the carbon atoms they are bound to form a

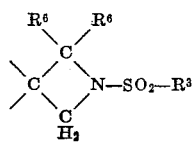

radical.

Suitable cationically active catalysts are e.g. strong acids, such as $H_2SO_4$, $HClO_4$ or alkane-sulphonic acid and p-toluenesulphonic acid and Lewis acids for example, boron trifluoride, boron trichloride, aluminum trichloride, ferric chloride, antimony pentachloride, titanium tetrachloride and tin tetrachloride, and also the fluorides of these metals or the addition compounds of the boron trihalides, in particular the addition compounds of boron trifluoride with ethers, carboxylic acid esters and anhydrides, amines, nitriles, and monocarboxylic or dicarboxylic acid amides, and also halogen-containing organometallic compounds of aluminum and tin and oxonium salts and carboxonium salts, such as, for example, triethyl oxonium fluoborate and 2-methyl dioxolenium fluoborate. Fluoborates of acryldiazonium compounds, which change at high temperatures into aryl cations with nitrogen being split off, are likewise suitable.

The catalysts are added to the polymerisation medium in quantities of 0.001% to 1% by weight, based on the weight of the trioxane being used.

The copolymerisation can be carried out as a block polymerisation, which takes place in a short time and with an almost quantitative yield. In this embodiment, the catalyst is melted together with the trioxane and the co-monomer is added simultaneously or the trioxane is melted together with the co-monomer and then the catalyst is added, optionally solved in an inert solvent. The polymerisation can also be carried out in suspension in an organic liquid, in which trioxane has only limited solubility. Straight-chain aliphatic hydrocarbons with more than 8 carbon atoms or their mixtures for example, a $C_{12}$ to $C_{18}$ hydrocarbon fraction having a boiling range of from 230° C. to 320° C., are examples for suitable copolymerisation media.

If the polymerisation is carried out as a solution polymerisation, the following solvents for example may be used: hydrocarbons as benzene, toluene, hexane, heptane, cyclohexane, isooctane, white spirit, hydrogenated trimeric isobutylene and chlorinated hydrocarbons.

In general, the polymerisation according to the invention is carried out at temperatures of from 50° C. to 120° C. and advantageously at from about 70° C. to 110° C. Most preferred is the temperature range from about 70° C. to 85° C. In particular cases, the indicated temperature ranges may be wider. The comonomers of this invention not only lead to improved polyoxymethylenes but the process of producing the new copolymers is improved as well. The new comonomers do not slow down the polymerisation velocity but the copolymerisation proceeds faster and more completely as e.g. the homopolymerisation of trioxane. This fact is surprising, as the comonomers alone do not polymerise to form homopolymers and thence it were to be expected that they do not copolymerise or at least impede the copolymerisation.

Depending on the intended purpose of copolymers in very different molecular weight ranges can be produced. Thus copolymers of high molecular weight with a reduced viscosity in the range of from about 0.6 to 3.0, measured at 60° C. in a 0.5 solution of p-chlorophenol are suitable for use as thermoplastic materials for the production of moulded elements by the injection moulding process or of fibres by melt-spinning or dry-spinning. In the production of such copolymers, the quantity of the organonitrogen compound which is introduced is advantageously from 0.5 mole percent to 5 mole percent, based on the trioxane used (calculated as $CH_2O$). Light stabilisers, dyestuffs and pigments can, for example, be added to these polymers and heat and oxidation stabilisers, fillers or plasticisers can also be added if desired.

If the copolymers are to be used as intermediate products or auxiliaries in the plastics field, lower molecular weights down to about 500 may also be desired. In such cases, a higher proportion of the nitrogen-containing co-monomer, up to about 50 mole percent based on the monomeric formaldehyde, can also be used. The copolymers which are obtained can in this case have an oily or resinous consistency at room temperature. With an increase in the proportion of formaldehyde, the crystallinity of the copolymers increases and the melting point rises.

In addition, the properties of the copolymers can be further modified by the additional use of other co-monomers, for example, cationically polymerisable olefines or cyclic organic oxygen compounds or organic sulphur compounds. To be mentioned as examples of these are styrene, acrylonitrile, ethyl vinyl ether, methyl vinyl sulphone or epoxy compounds such as ethylene oxide or propylene oxide, cyclic acetals such as 1,3-dioxolane, or either diethylene glycol formal or triethylene glycol formal, as well as other organic nitrogen co-monomers such as bis-(alkylsulphonyl)-imidazolidines, alkyl sulphonyl oxazolidines and alkyl sulphonyl thiazolidines. Substances which have proved particularly useful for this purpose are the difunctional sulphonyl acetidines which such even in small quantities produce a considerable rise in the melt viscosity when present internary systems with trioxane and one of these comonomers.

The copolymers produced in accordance with the process of the invention obtain their outstanding thermostability only after a brief thermal or chemical treatment, during the course of which relatively small fractions are decomposed. This can be effected by dry heating or by heating in suspension, e.g. in high boiling hydrocarbons, or in solution, for example, in dimethyl formamide, butyrolactam or dimethyl sulphoxide, at temperatures between 120° C. and over 200° C. The decomposition of unstable fractions can, however, also be carried out by the action of an aqueous sodium hydroxide solution or of alcohols with up to 6 carbon atoms, e.g., cyclohexanol, in the presence of basic compounds. Alkali hydroxides and organic bases such as pyridine, tri-n-butylamine and alkanolamines, are examples of suitable basic compounds. The decomposition down to co-monomer units can be effected by a granulation process in an extruder, optionally with the addition of organic bases.

Example 1

3 g. of N-p-toluosulphonyl acetidine are dissolved in 50 g. of trioxane at 70° C. After the addition of a 0.2 ml. of a 10% solution of boron fluoride etherate in ether, the mixture first of all becomes cloudy, then jelly-like and finally solid. The reaction is ended after 10 minutes. The solid block is comminuted, washed with acetone and kept for 10 hours under reflux, suspended in a 5% sodium hydroxide solution. The weight of the polymer then falls to 33 g. This residue is stable with respect to alkali, and, in the thermostability measurement at 220° C., shows an hourly loss in weight of 0.2%. The intrinsic viscosity, measured in a 0.5% solution in p-chlorophenol at 60° C., amounts to $\eta i^{60°} = 0.57$. The sulphur content of 0.59% shows that 4% of the co-monomer is incorporated.

Example 2

3 g. of N-methane sulphonyl acetidine are dissolved in 50 g. of trioxane at 70° C. After the addition of 0.2 ml. of a 10% solution of boron fluoride etherate in ether, the mixture reacts thoroughly in one hour to form a hard block. This is comminuted, washed with acetone, kept for 10 hours under reflux and suspended in a 5% sodium hydroxide solution. After this treatment, 31 g. of polymer are obtained which show an hourly weight loss of 0.2% at 220° C. The intrinsic viscosity $\eta i^{60°\,C.}$ measured in a 0.5% solution in p-chlorophenol at 60° C., is 0.64. The nitrogen and sulphur analyses show a co-monomer content of 3%.

Example 3.—Butanedisulphonyl-(1,4)-acetidine 15 g. of butane-1,4-disulphonic acid amide are dissolved in 100 ml. of a 16% aqueous solution, 30.5 g. of 1,3-dibromopropane are added, and the mixture is kept under reflux for 8 hours with stirring. On cooling, a precipitate crystallises out, and this is filtered under suction, washed with a 10% sodium hydroxide solution and recrystallised from ethanol. 2 g. of a product having a melting point of from 145° C. to 146° C. are obtained.

$C_{10}H_{20}N_2O_4S_2$ (296.3): calculated C, 40.54; H, 6.80; S, 21.60; N, 9.46. Found: C, 40.43; H, 6.69; S, 21.37; N, 9.50.

Example 4

1 g. of butane disulphonyl-(1,4)-acetidine is dissolved in 25 g. of trioxane at 70° C. After the addition of 0.2 ml. of a 10% boron fluoride etherate solution in ether, the melt is solidified within 5 minutes into a solid block. It is comminuted, washed with acetone and kept under reflux for 10 hours in a 5% sodium hydroxide solution. 8 g. of a polymer having an intrinsic viscosity $$\eta i^{60°\,C.} = 0.909$$

(measured in 0.5% solution in p-chlorophenol at 60°) are obtained. The loss in weight at 220° C. is 0.1% per hour.

Example 5

300 g. of trioxane and 18 g. of N-toluosulphonyl acetidine are dissolved in 300 g. of cyclohexane. 5 ml. of a 2% $BF_3$-dibutyl ether solution in cyclohexane are added at 70° C. The temperature of 70° C. is maintained for 4 hours with stirring. The precipitate which forms is filtered off and washed with methanol. After treatment with a 5% sodium hydroxide solution, 70% of a polymer with an intrinsic viscosity $\eta i^{60°\,C.} = 1.04$, measured at 60° C. in a 0.5% solution in p-chlorophenol is obtained. At 220° C., the product initially loses 8% of its weight and subsequently still loses 1% of its weight per hour.

Example 6

2.5 g. of 2-methyl-N-toluosulphonyl acetidine (J. Org. Chem. 26, 143 (1961)) are dissolved at 70° C. in 50 g. of trioxane. After the addition of 0.2 ml. of a 10% solution of $BF_3$ etherate in ether, the mixture is completely reacted in 10 minutes to form a hard block. Treatment with a sodium hydroxide solution as in Example 1 yields 51 g. of a stable material having an intrinsic viscosity $\eta i^{60°\,C.} = 0.650$, which contains 6.4% of the co-monomer.

Example 7

1 g. of 6-p-toluosulphonyl-2-oxa-6-aza-spiro-[3,3]-heptane (prepared from 3,3-bis-bromomethyl-oxacyclobutane and p-toluosulphonamide, M.P. 147°) is dissolved in 50 g. of trioxane at 70° C. 0.2 ml. of a 10% $BF_3$-etherate solution is added; the mixture reacts completely in 5 minutes to form a solid block. The treatment with a sodium solution as in Example 1 provides 12 g. of a polymer which initially loses 20% of its weight at 220° C. and is stable thereafter. It contains 5% of the sulphonamide co-monomer. On melting, a tacky, rubber-like mass is obtained, whereas the copolymers with toluosulphonyl acetidine produce tough, stringy melts.

Example 8.—2,6-di-toluosulphonyl-2,6-diaza-spiro-[3,3]-heptane

The compound can be prepared from tribromo monoacetyl-pentaerythritol (Chem. Soc. 1938, 1594). It is obtained in a better yield from tetrabromo-pentaerythritol and toluosulphonamide in a dimethyl formamide and KOH solution.

Example 9

0.2 ml. of a 10% $BF_3$-etherate solution in ether is added to the solution of 2 g. of 2,6-di-toluosulphonyl-2,6-diaza-spiro-[3,3]-heptane in 50 g. of trioxane at 70° C. The mixture is completely reacted in one minute to form a solid block. Treatment with a sodium hydroxide solution as in Example 1 provides 11 g. of polymer, which melts in a rubbery and tacky form and contains 7% of the sulphonamide co-monomer.

Example 10

3 g. of bis-methanesulphonyl imidazolidine and 1 g.

of 2,6 - di - toluosulphonyl - 2,6 - diaza - spiro - [3,3]-heptane are dissolved in 50 g. of trioxane at 70° C. 0.1 ml. of a 10% BF₃-etherate solution in ether produces a solid block in 4 minutes. A sodium hydroxide treatment as in Example 1 yields 21 g. of stable material, which contains 1.12% of sulphur and melts in a tacky, rubber-like form.

Example 11.—2,6-di-methylsulphonyl-2,6-diaza-spiro-[3,3]-heptane 47.5 g. of methane sulphonamide and 97 g. of tetrabromo pentaerythritol are dissolved in 600 ml. of dimethyl formamide. 56 g. of potassium hydroxide, dissolved in 30 ml. of water, are added and the mixture is heated with stirring at 125° C., while some water distills off until the alkali is consumed. It is filtered off from precipitated potassium bromide and the dimethyl formamide is distilled off in vacuo. The residue is washed with a 5% sodium hydroxide solution and recrystallised from glycol monomethyl ether. Yield 7 g., M.P. 197°–198° C.

$C_7H_{14}N_2S_2O_4$ (254): calculated C, 33.1; H, 5.5; N, 11.0; S, 25.2. Found: C, 33.16; H, 5.73; N, 11.12; S, 25.38.

Example 12

2 g. of 2,6-dimethylsulphonyl-2,6-diaza-spiro-[3,3]-heptane are dissolved in 50 g. of trioxane at 70° C. After the addition of 0.2 ml. of a 10%-etherate solution in ether, the system is completely reacted in 2 minutes to form a solid block. Comminution and working up in sodium hydroxide produce 12 g. of a stable polymer, which melts in a tacky rubber-like form.

Example 13

3 g. of bis-methylsulphonyl-imidazolidine and 0.5 g. of 2,6 - dimethylsulphonyl - 2,6 - diaza - spiro - [3,3]-heptane are dissolved in 50 g. of trioxane at 70° C. After the addition of 0.1 ml. of a 10% BF₃-etherate solution in ether, polymerisation occurs in 2 minutes. After treatment with a sodium hydroxide solution, 23 g. of a stable product, which melts in tacky rubber-like form remain.

Example 14

300 g. of trioxane, 15 g. of bis-methylsulphonyl imidazolidine and 3 g. of 2,6-ditoluosulphonyl-2,6-diaza-spiro-[3,3]-heptane are dissolved at 70° C. in 300 g. of cyclohexane. After the addition of 5 ml. of a 2% BF₃ dibutyl ether solution in cyclohexane, cooling must take place in order to prevent the temperature from rising above 70° C. After 1 hour, the precipitated polymer is filtered off and washed with methanol. 285 g. of crude polymer are obtained and, after treatment with a 5% sodium hydroxide solution, 252 g. of stable material are obtained with an intrinsic viscosity $\eta i^{60°\ C.}=1.42$.

We claim:
1. Copolymers produced by the reaction in the presence of a cationic catalyst of trioxane and 0.5 to 5 mol percent of acetidines of the formula:

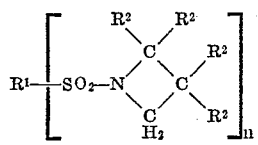

wherein R² when taken alone is hydrogen or alkyl having 1 to 6 carbon atoms, R² when taken together with another R² stands for a 4-membered saturated heterocyclic ring having oxygen or nitrogen as the heteroatom, n is 1 or 2, R¹ is alkyl having 1 to 6 carbon atoms, phenyl or tolyl when n is 1 and R¹ is alkylene having 1 to 6 carbon atoms, phenylene or toluene when n is 2.

2. Copolymers according to claim 1 wherein said acetidine is N-p-toluene-sulfonylacetidine.
3. Copolymers according to claim 1 wherein said acetidine is N-methane-sulfonylacetidine.
4. Copolymers according to claim 1 wherein said acetidine is disulfonyl-(1,4)-acetidine.
5. Copolymers according to claim 1 wherein said acetidine is 6 - p - toluene-sulfonyl-2-oxa-6-aza-spiro-[3,3]-heptane.
6. Copolymers produced by the reaction in the presence of a cationic catalyst or trioxane and (A) 0.5 to 5 mol percent of an acetidine of the formula:

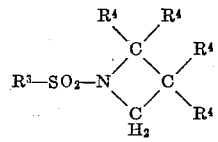

wherein R³ is alklyl having 1 to 6 carbon atoms, phenyl or tolyl, R⁴ when taken alone is hydrogen or alkyl having 1 to 6 carbon atoms and R⁴ when taken together with another R⁴ forms a 4-membered heterocyclic ring having oxygen as the heteroatom and (B) 0.05 to 0.5 mol percent of an acetidine compound of the formula:

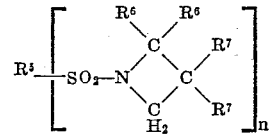

wherein n is 1 or 2; when n is 1, R⁵ is alkyl having 1 to 6 carbon atoms, phenyl or tolyl, R⁶ is hydrogen or alkyl having 1 to 6 carbon atoms and the R⁷ radicals together with the carbon atom that they are attached to form a radical of the formula

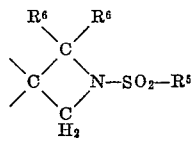

wherein R⁵ and R⁶ are as aforesaid; and wherein when n is 2, R⁵ is alkylene having 1 to 6 carbon atoms, phenylene or toluene, and R⁶ and R⁷ are hydrogen or alkyl having 1 to 6 carbon atoms.

7. Copolymers according to claim 6 wherein said acetidine (A) is N-p-toluene-sulfonylacetidin and said acetidine (B) is disulfonyl-(1,4)-acetidin.

8. Process for producing trioxane copolymers which comprises copolymerizing trioxane and 0.5 to 5 mol percent based on the trioxane, of an acetidine compound at temperatures between 50 and 120° C. in the presence of a cationically active catalyst, said acetidine compound being of the formula:

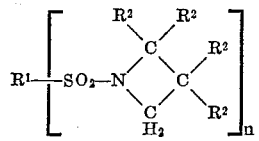

wherein R² when taken alone is hydrogen or alkyl having 1 to 6 carbon atoms, R² when taken together with another R² stands for a 4-membered saturated heterocyclic ring having oxygen or nitrogen as the heteroatom, n is 1 or 2, R¹ is alkyl having 1 to 6 carbon atoms, phenyl or tolyl when n is 1 and R¹ is alkylene having 1 to 6 carbon atoms, phenylene or toluene when n is 2.

9. Process according to claim 8 wherein said copolymerisation is carried out in bulk.
10. Process according to claim 8 wherein said copolymerisation is carried out in suspension in an organic liquid.
11. Process according to claim 8 wherein said copolymerisation is carried out in a hydrocarbon solvent.
12. Process according to claim 8 wherein said cationically active catalyst is selected from inorganic acids and Lewis acids.

References Cited

UNITED STATES PATENTS

| | | |
|---|---|---|
| 2,072,971 | 3/1937 | Walter. |
| 2,331,376 | 10/1943 | D'Alelio. |
| 2,545,174 | 3/1951 | Sido. |
| 2,207,803 | 7/1940 | Hill. |

FOREIGN PATENTS 508,801  7/1939  Great Britain.

OTHER REFERENCES

J. of Organic Chemistry, 26, 138 (1961).

WILLIAM H. SHORT, *Primary Examiner.*

H. E. SCHAIN, *Assistant Examiner.*